Aug. 4, 1931.  J. E. McNEIL  1,817,457
OIL TANK GAUGE
Filed April 16, 1930
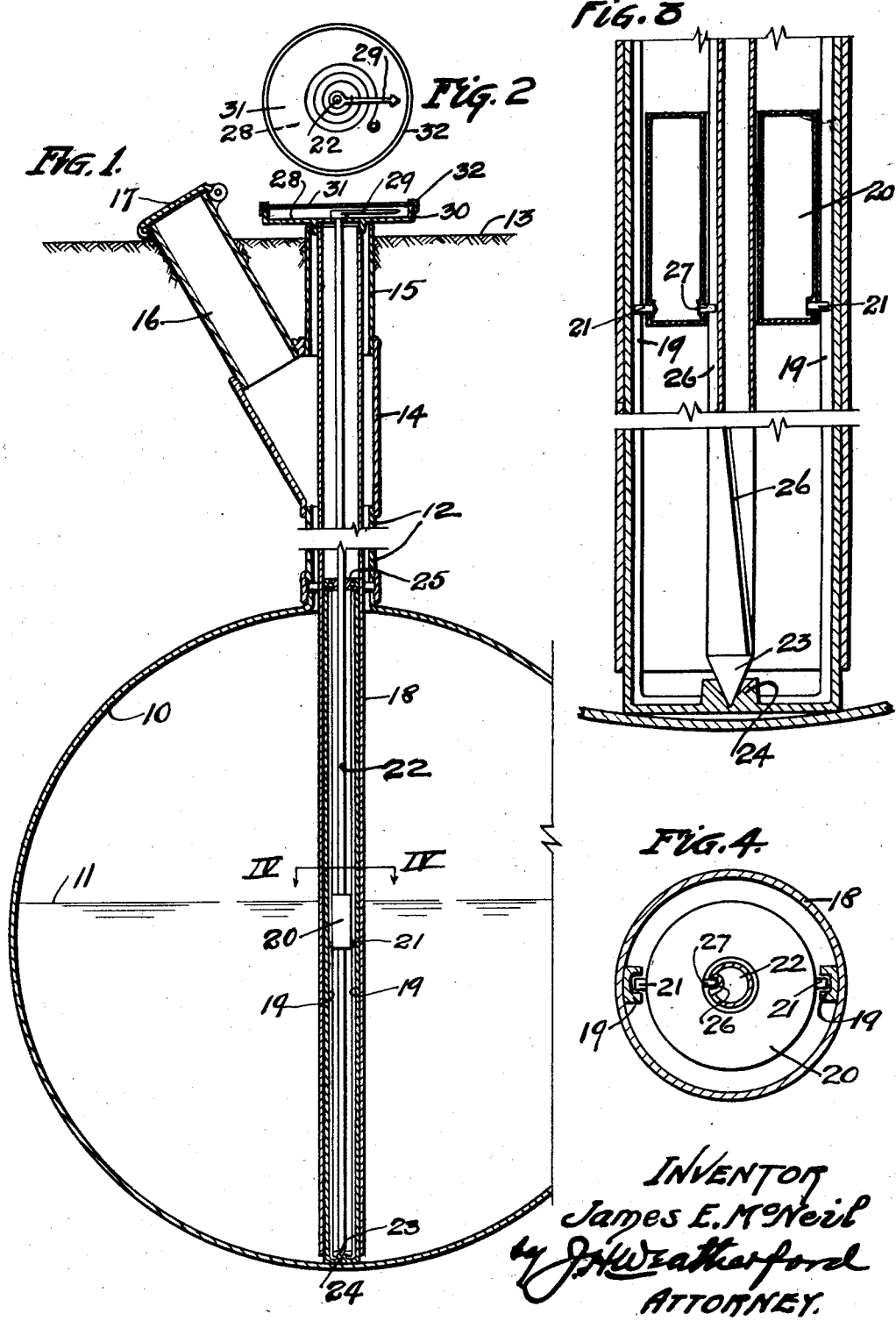

Patented Aug. 4, 1931

1,817,457

UNITED STATES PATENT OFFICE

JAMES E. McNEIL, OF RALEIGH, TENNESSEE

OIL TANK GAUGE

Application filed April 16, 1930. Serial No. 444,660.

This invention relates to improvements in gauges for indicating the depth of a liquid in a tank and has especial reference to a gauge for underground tanks such as are used in the storing of gasoline or other oils at filling stations.

At such stations the gasoline tanks from which gasoline is drawn for vending are ordinarily buried a number of feet below ground and are therefore not accessible. The supply of gasoline in such tanks is diminished from time to time as gasoline is drawn out and is of course replenished as occasion may require. It is of extreme importance that the amount of gasoline in the tank be readily ascertainable in order that check may be kept on sale receipts as compared with amounts withdrawn from the tank. Also in replenishing the supply in the tank measurement is often made with five gallon containers and the count of the number of such containers emptied into the tank is often questioned. It is of extreme importance therefore that a check be had at such times. The tanks ordinarily used are cylindrical tanks varying usually in diameter from three to six feet and of various lengths. When placed in the ground they are often not longitudinally leveled up or when they are initially leveled one end often settles so that in use they are not level. It follows therefore that where gauges are used which depend on the depth of liquid in the tank there is often wide variations between the theoretical and the actual readings.

Inasmuch as the top of the tank is well below the surface of the ground and filling is done through a pipe which extends down to the tank it is almost essential in tanks already in place or at least advisable, that the gauging device may be inserted through such pipe and yet that it shall not interfere with the use of the pipe for filling the tank.

The objects of the present device therefore are:

(a) To make a gauge which may be placed within the tank through the filling pipe therefor;

(b) To modify the filling pipe so that it may be used in connection with the gauge;

(c) To stiffen up the actuating parts of the gauge mechanism so that they will work satisfactorily in spite of the large dimensions of the tanks, and the comparatively limited diameter of the filling pipe, with which they are to be used; and (d) To provide means for calibrating the gauge to conform it properly with the size and positioning of the tank with which it is used.

The means by which the foregoing and other objects are accomplished and the manner of their accomplishment will readily be understood from the following specification on reference to the accompanying drawings in which:

Fig. 1, is a sectional elevation on the center line of the filling pipe;

Fig. 2, is a plan view of the pointer and dial;

Fig. 3, is a fragmentary section on the same line as Fig. 1, showing the float and rod used in connection therewith; and Fig. 4, is a section taken on the line IV—IV of Fig. 1.

Referring now to the drawings, 10 is the shell of the tank 11 a liquid level therein. 12 is a filler pipe extending upward from the tank toward the surface 13 of the ground, a portion of this pipe being broken away. This pipe has been cut off below the surface of the ground and a Y 14, secured thereon. From the top of this Y an extension 15 of the filler pipe continues to the surface of the ground and a pipe 16 leads from the branch of the Y to the ground surface being there covered by the usual filler cap 17, for which locking means may be provided should it be so desired.

Disposed within the filler pipe 12—15 is a gauge pipe 18 which extends from the surface of the ground preferably to the bottom of the tank. Within this tube and substantially co-extensive with a diameter of the tank, are channel shaped guides 19 which are secured to the inner wals of the tube. Disposed within in the gauge pipe is a float 20 from the lower end of which float oppositely disposed pins 21 are secured and extend outward into the channels 19. The float 20 has a central opening therethrough which loosely surrounds a vertical tube 22 along which tube the float rises and falls as the liquid level rises and falls. The tube 22 is provided with a hardened point 23 at its lower end which point rests and turns in a hardened socket 24, the contact and resulting friction of these co-acting parts being reduced as far as possible to a minimum. Disposed within the gauge pipe 18 and preferably resting on top of the guide channels 19 is a bearing 25, preferably a roller bearing, which steadies the tube 22 and yet permits free rotation thereof. Extending spirally between the bearings 24 and 25 and making substantially a complete turn around the tube is a spiral groove 26 (shown only in Figs. 3 and 4) with which groove a pin 27 secured in the float adjacent the lower end thereof and extending inward therefrom, engages. Preferably the groove 26 is formed by depressing the wall of the tube inward so that the entire strength and stiffness of the tube will be maintained.

The tube 22 extends above the bearing 25 to the uper end of the structure slightly above the ground and there passes through a plate 28 which serves as a dial or on which a dial may be secured. Mounted and secured on the upper end of the tube 22 is a pointer 29. Preferably the outer edge of the dial plate is provided with an upwardly turned annular flange 30 which forms a box in which the pointer is disposed. 31 is a glass cover plate for this box which cover may be held in place as by a ring 32. 33 is a very light spiral spring or hair spring which holds the pointer 29 steady during movement thereof and prevents any lost motion which would otherwise introduce inaccuracies into the readings.

It will be especially noted that the part 22 is a tube giving the maximum stiffness, that this tube is grooved by indenting the wall thereof, whereby its stiffness is preserved, that the float is guided vertically by pins which give a minimum contact and friction loss in the guides, and that the contact of the float with the tube is also effected by a pin which gives a limited contact with the tube groove and limited frictional resistance. It will be further noted that these pins are located adjacent the lower end of the float so that they follow the lift exerted by the liquid on the float and thereby may act without tendency of such pull to twist and jam them.

It will be noted that the dial is made without graduations. This is done in order that the dial may be marked to agree with definite quantities of liquid in the tank. To accomplish this all of the liquid which can be removed from the tank is removed, thus establishing for the tank a zero point or positioning of the gauge pointer which however ordinarily is not marked. Thereafter a measured quantity of liquid, ordinarily five gallons, is poured into the tank and the corresponding position of the gauge pointer is marked on the dial. Additional increments of liquid carefully measured are then successfully poured into the tank and the position of the pointer noted for each such increments until the tank is filled. Such of these markings as desired may then be provided with proper indicia to show the amount of liquid such mark indicates as being in the tank, and the device is ready for use.

The procedure followed in the installing of one of these gauges is to dig down around the filler pipe, cut same off at the proper distance below the ground level and secure the Y thereon, extend the Y branch to the surface of the ground and put on the proper filling cap and such locking means as may be desired, replace that portion of the original filler pipe from the top of the Y to the surface of the ground. Place the gauge pipe within the filler pipe, using one suitable to the diameter of the tank, cut off the gauge pipe and indicator tube at the proper height above the top of the filler pipe, install the dial and box in place and secure the pointer to the indicator tube without necessarily giving it any particular positioning. The tank should then be emptied, a desired quantity of liquid be placed therein and the position of the indicator marked. An additional measured quantity is poured into the tank and the position of the pointer again marked, and such procedure is then repeated until the tank is full, any or all of the marks thus placed may be designated by the number of gallons they indicate. The cover plate is placed on the box and secured by the ring and the device is ready for use.

It will be understood that the tube 22 above the upper bearing 25 may be detachable from the lower part should it be so desired.

Having described my invention, what I claim is:

In a tank gauge, a dial, a pipe carrying said dial and extending vertically downward therefrom to the bottom of said tank, said pipe being open at its lower end so as to establish communication between said pipe and tank opposite disposed guides secured within said pipe and substantially co-extensive with said tank diameter, extending upward from the bottom of said tank, a pointer co-operating with said dial, a tube carrying said pointer, and having inherent stiffness, extending vertically downward from said pointer to the bottom of said tank, and within said pipe, bearings for said tube at the bottom of said tank, and at the top thereof, said upper bearing being disposed within said pipe and supported on the upper end of said guides, said tube having a groove substantially accomplishing a complete spiral therearound between said bearings, a float disposed around said tube, a pin projecting inward from said float into said groove, pins projecting oppositely outward from said float, and co-acting with said guides to prevent rotation of said float, said pins being disposed adjacent the bottom of said float.

In testimony whereof I hereunto affix my signature.

JAMES E. McNEIL.